US010887019B2

(12) United States Patent
Choudhury et al.

(10) Patent No.: US 10,887,019 B2
(45) Date of Patent: *Jan. 5, 2021

(54) MULTI-LAYER SYSTEM OPTIMIZATION

(71) Applicant: AT&T Intellectual Property I, L.P., Atlanta, GA (US)

(72) Inventors: Gagan Choudhury, Jackson, NJ (US); Kathleen Meier-Hellstern, Cranbury, NJ (US); Alvin Goddard, Kendall Park, NJ (US); Narayan Padi, Cedar Knolls, NJ (US); Simon Tse, Holmdel, NJ (US); Tzuu-Yi Wang, Newtown, PA (US); Kathleen Tse, Holmdel, NJ (US); Martin Birk, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/733,844

(22) Filed: Jan. 3, 2020

(65) Prior Publication Data

US 2020/0145104 A1    May 7, 2020

Related U.S. Application Data

(63) Continuation of application No. 16/022,212, filed on Jun. 28, 2018, now Pat. No. 10,547,384.

(51) Int. Cl.
*H04B 10/27* (2013.01)
*H04L 12/24* (2006.01)
*H04J 14/02* (2006.01)
*G06F 16/23* (2019.01)

(52) U.S. Cl.
CPC ............ *H04B 10/27* (2013.01); *H04J 14/021* (2013.01); *H04L 41/0813* (2013.01); *G06F 16/23* (2019.01)

(58) Field of Classification Search
CPC ..... H04B 10/27; H04B 10/116; H04J 14/021; H04L 41/0813
See application file for complete search history.

(56) References Cited

U.S. PATENT DOCUMENTS

| 7,254,138 B2 | 8/2007 | Sandstrom |
| 7,269,185 B2 | 9/2007 | Kirkby et al. |
| 7,746,789 B2 | 6/2010 | Katoh et al. |
| 7,864,751 B2 | 1/2011 | Greenberg |
| 7,933,203 B2 | 4/2011 | Hahm |
| 8,423,630 B2 | 4/2013 | Ciscon et al. |
| 9,077,478 B1 | 7/2015 | Schmidtke et al. |

(Continued)

FOREIGN PATENT DOCUMENTS

WO    WO 2016/086709 A1    6/2016

OTHER PUBLICATIONS

Felix et al.; "Multi-layer SDN on a commercial Network Control Platform for Packet Optical Networks"; IEEE Optical Fiber Communications Conf. and Exhibition; 2014; 3 pages.

(Continued)

*Primary Examiner* — Dzung D Tran
(74) *Attorney, Agent, or Firm* — BakerHostetler

(57) ABSTRACT

A software-defined network multi-layer controller (SDN-MLC) may communicate with multiple layers of a telecommunication network. The SDN-MLC may have an optimization algorithm that helps manage, in near real-time, the multiple layers of the telecommunication network.

20 Claims, 10 Drawing Sheets

(56) References Cited

U.S. PATENT DOCUMENTS

| | | |
|---|---|---|
| 9,166,920 B2 | 10/2015 | Bolt et al. |
| 9,225,603 B2 | 12/2015 | Liu et al. |
| 9,294,406 B2 | 3/2016 | Liou et al. |
| 9,332,324 B2 | 5/2016 | Xu et al. |
| 9,520,961 B2 | 12/2016 | Xia et al. |
| 9,553,813 B2 | 1/2017 | Vasseur et al. |
| 9,577,782 B2 | 2/2017 | Prakash et al. |
| 9,602,306 B2 | 3/2017 | Lopez Alvarez et al. |
| 9,813,299 B2 | 11/2017 | Htay |
| 9,838,111 B2 | 12/2017 | Schmidtke et al. |
| 9,838,296 B2 | 12/2017 | Armolavicius et al. |
| 9,847,951 B2 | 12/2017 | Htay et al. |
| 9,877,091 B2 | 1/2018 | Chen et al. |
| 9,900,244 B2 | 2/2018 | Roy et al. |
| 10,547,384 B2 * | 1/2020 | Choudhury ......... H04L 41/0813 |
| 2003/0179717 A1 | 9/2003 | Hobbs et al. |
| 2009/0122707 A1 | 5/2009 | Weinan |
| 2015/0029846 A1 | 1/2015 | Liou et al. |
| 2015/0229846 A1 * | 8/2015 | Misawa ................. G03B 17/02 348/333.12 |
| 2017/0223436 A1 * | 8/2017 | Moynihan .......... H04Q 11/0003 |
| 2017/0295090 A1 | 10/2017 | Gopalan et al. |
| 2017/0324671 A1 * | 11/2017 | Zhang ................... H04L 45/64 |
| 2017/0353246 A1 | 12/2017 | Frankel et al. |
| 2018/0262421 A1 * | 9/2018 | Skalecki ................ H04L 45/12 |

OTHER PUBLICATIONS

Gringeri et al.; "Extending Software Defined Network Principles to Include Optical Transport"; IEEE Communications Magazine; 2013; p. 32-40.

Rodrigues et al.; "Traffic Optimization in Multi-Layered WANs using SDN"; IEEE $22^{nd}$ Annual Symposium; 2014; 8 pages.

Shirazipour et al.; "Realizing Packet-Optical Integration with SDN and OpenFlow 1.1 Extensions"; IEEE Int'l Conf. Communications (ICC); 2012; p. 6633-6637.

Channegowda et al.; "Experimental demonstration of an OpenFlow based software-defined optical network employing packet, fixed and flexible DWDM grid technologies on an international multi-domain testbed"; Optics Express; vol. 21 No. 5; Mar. 2013; p. 5487-5498.

Channegowda et al.; "Software-Defined Optical Networks Technology and Infrastructure: Enabling Software-Defined Optical Network Operations (Invited)"; J. Opt. Commun. Network; vol. 5 No. 10; Oct. 2013; p. A274-A282.

\* cited by examiner

300

306

| COMMUNICATION CONNECTION 308 |
| INPUT 310 |
| OUTPUT 312 |

304

| PROCESSOR 302 |
| REMOVABLE STORAGE 318 |
| NONREMOVABLE STORAGE 320 |
| VOLATILE STORAGE 314 |
| NONVOLATILE STORAGE 316 |

FIG. 7

MULTI-LAYER SYSTEM OPTIMIZATION

CROSS-REFERENCE TO RELATED APPLICATIONS

This application claims the benefit of U.S. NonProvisional patent application Ser. No. 16/022,212, filed on Jun. 28, 2018, entitled "Multi-Layer System Optimization," the contents of which are hereby incorporated by reference herein.

BACKGROUND

A packet layer of the network may include internet protocol (IP) links connected among IP devices such as router ports. The IP links may be routed over a path in the optical layer and use reconfigurable optical add-drop multiplexers (ROADMs) and transponders at the endpoints, and optical signal regenerators (or repeaters) in the middle of the path when the path is too long. IP ports, optical transponders, and optical regenerators are typically associated with a certain bandwidth unit such as 40 Gbps, 100 Gbps, 200 Gbps, or 400 Gbps. If there are N traffic endpoints and K Quality of Service (QoS) classes then the traffic matrix consists of K*N*(N−1) individual traffic units, all of which may change over time. This disclosure is directed to addressing proactive configuration changes with regard to different layers of the network.

SUMMARY

Disclosed herein are techniques that may address repeated joint global optimization (e.g., whenever network condition changes) while running a multi-layer network. These network condition changes may be based on scheduled outages (e.g., maintenance activity such as software upgrades) or unscheduled outages (e.g., caused by fiber cuts or failure of IP or optical devices). A software-defined network multi-layer controller (SDN-MLC) may communicate with multiple layers of a telecommunication network, which may include dynamic fiber cross connect equipment in order to implement needed network configurations.

The SDN-MLC may have an optimization algorithm that helps manage, in near real-time, the multiple layers of the telecommunication network. Joint multi-layer global optimization may be used to respond to network condition changes caused by traffic matrix changes, scheduled outages, or unscheduled outages.

In an example, an apparatus (e.g., software-defined network controller) may include a processor and a memory coupled with the processor that effectuates operations. The operations may include: obtaining, by a device, multiple layer information associated with multiple layers of a telecommunications network, the multiple layer information may comprise optical layer information or router layer information; forecasting a network condition based on machine learning that uses the multiple layer information; based on the forecasting, determining that the network condition may be avoided based on configuration changes of the telecommunications network; and based on the determining of the configuration changes, sending, by the device, a message to another device in order to instruct it to automatically implement the configuration changes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 7 illustrates a schematic of an exemplary network device.

DETAILED DESCRIPTION

Conventional approaches may assume that the mapping between an IP link and the set of optical transponders and regenerators needed underneath is fixed and if any component fails, the entire IP link fails and the non-failed components of the IP link are rendered unusable. Also, conventional approaches may assume consideration of traffic routing over the IP layer and the optical layer separately. Conventionally, optical layer optimization (e.g., the choice of IP links and their mapping over the optical layer) may rarely be done (e.g., once) and when optical layer optimization is done it is usually with a consideration that the IP layer traffic should only be routed over these once-determined set of IP links. Again, due to lack of joint global optimization of IP and optical layers, conventional approaches used significantly high IP resources and optical resources.

Disclosed herein are techniques that may address repeated joint global optimization (whenever network condition changes) while operating a multi-layer network. These network condition changes may be based on scheduled outages (e.g., maintenance activity such as software upgrades), unscheduled outages (e.g., caused by fiber cuts or failure of IP or optical devices), or planned or unplanned traffic changes (e.g., spike in traffic to an internet resource because of an emergency or website promotion). When the unscheduled outages or traffic changes are encountered, the global optimization may take place in real-time.

Figure 1A:
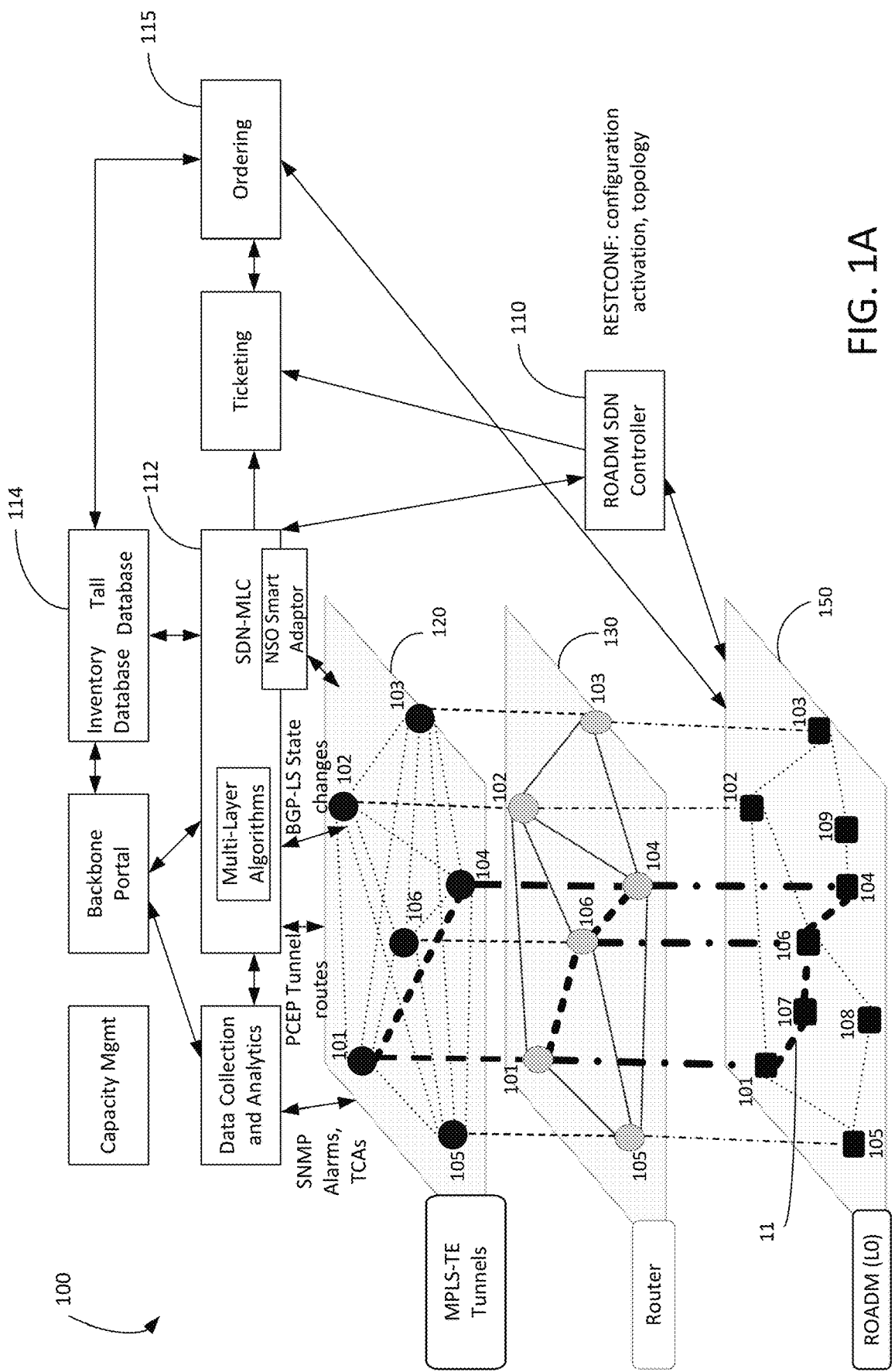
FIG. 1A illustrates an exemplary system for managing multi-layer self-optimization.

FIG. 1A illustrates an exemplary system for near real-time self-optimization. Software-defined network multi-layer controller 112 (SDN-MLC 112) may communicate with multiple layers of system 100 (e.g., a telecommunication network). SDN-MLC 112 may have an optimization algorithm that helps manage multiple layers of the network. The multiple layers may include optical layer 150, router layer 130 (which may also be a switch layer), and multi-protocol label switching (MPLS) tunneling layer 120. As generally shown in FIG. 1A (and with more detail in FIG. 1B), there may be multiple sites, which include one or more components that help build one or more physical or logical connections. For example, in FIG. 1B, for site 101 it may include router 131, tail 161, ROADM 151, or regenerator 171 of FIG. 1B). FIG. 1A illustrates connections between multiple sites as may be seen at each level. Sites include site 101 through site 109. Some sites (e.g., site 107) may have optical equipment (ROADM 157), but may not have routing equipment.

Figure 1B:
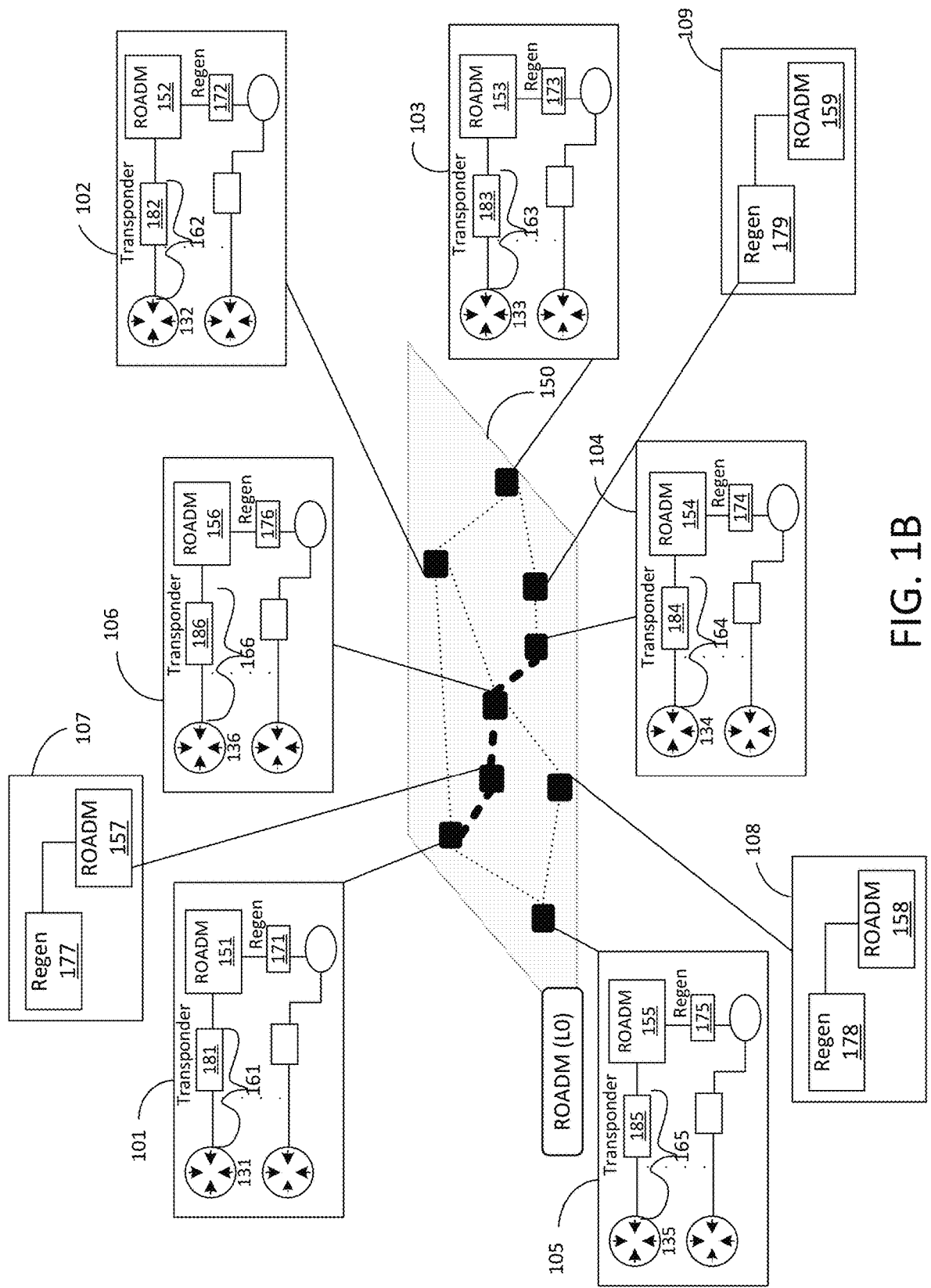
FIG. 1B illustrates FIG. 1A in further detail.

FIG. 1B illustrates FIG. 1A in further detail. Optical layer 150 may include multiple components, which are optional based on circumstance, such as reconfigurable optical add-drop multiplexer (ROADMs) (e.g., ROADM 151-ROADM 159), tails (e.g., tail 161-tail 168), and regenerators (e.g., regenerator 171-regenerator 178). A ROADM is a form of optical add-drop multiplexer that adds the ability to remotely switch traffic from a wavelength-division multiplexing (WDM) system at the wavelength layer. A tail is a connection between an internet protocol (IP) port (e.g., port of router 131) and a transponder port (e.g., port of transponder 181). In optical fiber communications, a transponder may be the element that sends and receives the optical signal from a fiber. A transponder is typically characterized by its data rate and the maximum distance the signal can travel. An optical communications regenerator may be used in a fiber-optic communications system to regenerate an optical signal. Such regenerators may be used to extend the reach of optical communications links by overcoming loss due to attenuation of the optical fiber. Some regenerators may also correct for distortion of the optical signal by converting it to an electrical signal, processing that electrical signal, and then retransmitting an optical signal. Router layer 130 may include routers (e.g., router 131-router 136) or switches (not shown). MPLS layer 120 may have several tunnels logically connected via the routers in router layer 130.

Figure 2:
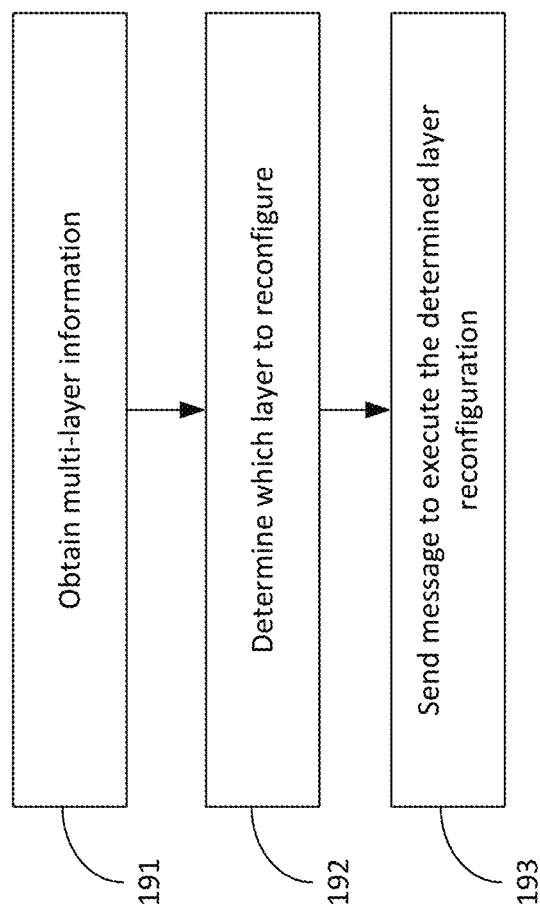
FIG. 2 illustrates an exemplary method for managing multi-layer system self-optimization.

FIG. 2 illustrates an exemplary method for near real-time self-optimization. In an exemplary scenario, as shown in FIG. 1A and FIG. 1B, there may be a system 100 with an optical layer 150, router layer 130, and a MPLS layer 120. At step 191, information about each layer may be obtained, which may be over seconds, minutes, days, weeks, months, or more. This information may be before, during, or subsequent to an outage or other event of system 100 and may be used for forecasting. The information may assist in understanding activity patterns for system 100. For example, activity patterns (which may include scheduled or unscheduled outages) may include the frequency of network link outages (and flow of traffic activity thereafter), dates and times of significant traffic load on system 100, minimum or maximum average (or median) traffic load on system 100 during a period, traffic matrix changes, trouble tickets (outages may be experienced by users, but not detected through normal techniques), or estimated time of repair on a layer (which may be based on similar errors, alarms, or diagnosed issues), among other things. Information may be gathered on each layer. For MPLS layer 120, the information may include the MPLS interface state, reserved bandwidth, or label switching paths, among other things. For router layer 130, there may be information that includes input bytes, output bytes, input packets, output packets, input errors, input drops, input framing errors, output errors, output drops, usual traffic load on affected link, types of traffic on affected link (e.g., defined QoS, video, voice, TCP, UDP, source address, etc.), or routing information, among other things. The router layer information may be obtained from one or more routers. For optical layer 150, the information may include location of optical equipment (e.g., transponder 181, regen 171, ROADM 157, or tails), errors from the optical equipment, length of optical paths, or outages of the optical equipment, among other things. The optical layer information may be obtained from one more ROADMs.

With continued reference to FIG. 2, based on multi-layer information of step 192 (e.g., optical layer and router layer information), there is a determination whether a change short-term or intermediate-term change in configuration of existing capacity of the optical layer or router layer may resolve undesirable network conditions (e.g., anticipated performance problems, such as dropped packets, low bandwidth, etc.) alerted to by the information (e.g., information of step 191). A resolution may be based on a predetermined period and predetermined engineering (or the like) thresholds. The period would usually range from days to weeks or months. The predetermined engineering thresholds may include service level agreements (SLAs) for transport for much of the information of step 191, such as errors, traffic loads, or types of traffic, among other things. For example, in this scenario, the load along an optical path site 101-107-106-104 (i.e., path 11) may have reached a threshold (e.g., 80 percent) during a period (e.g., 30 minute time frame), which may cause errors or latency. A first selected option may be for ROADMs along the path (e.g., ROADM 151, ROADM 157, ROADM 156, and ROADM 154) to add one more wavelengths carrying data channels to increase the capacity along path 11. This may be preferred over changing a routing path at routing layer 130, because there may be a tendency for the routing protocol to send traffic through router path site 105-104, which actual goes over optical path site 106-104 and doesn't help resolve the congestion. Or alternatively, it may be selected because SDN-MLC 112 may constantly have to adjust the routing metrics, which may cause high utilization (e.g., eventually slow response) of SDN-MLC 112, or it may be selected because routing changes would have a service fall outside its SLA.

A second selected option (at a different time with different weighted info) may be for just the router layer 120 to be changed. Routes to some or all the traffic may be weighted to go through one or more routers (e.g., router 132) of site 102, because optical path site 102-103-109-104 does not go through optical path site 106-104. An additional consideration that may have led for this second selection option may be that the ROADMs could not (e.g., no more channels available) or should not increase its wavelength based on the information as disclosed in step 191. A third selected option (at yet a different time with different weighted info) may decide to do a combination of router layer 130 and optical layer 150 solutions (e.g., configuration changes) in order to reduce the traffic to an acceptable threshold (e.g., 30 percent). For instance, traffic for a couple of heavy users along the path may be redirected and stay within SLAs, while an increase in ROADM may be enough to accommodate the traffic load based on information of other users. SDN-MLC 112 may be used to determine the change needed in this step 192.

With reference to step 192, it may have sub-divided steps for forecasting (e.g., proactive network changes). For example, there may be a determination of somewhat immediate (e.g., near real-time) changes to configurations that may be communicated to router layer 130 or optical layer 150 devices. There may also be a consideration of the different parts within system 100 (e.g., see FIG. 3) that may not be automatically or immediately changed, but would provide optimization (for example) that would address issues determined by analyzing the information of step 191 or the like. As shown, SDN-MLC 112 may obtain data from different sources, such as tail database 114, which allows SDN-MLC 112 to know the current usage of router layer 130 components or optical layer 150 components. If a regenerator, ROADM, tail, or the like are not in use (e.g., because of reprovisioned customer service) or can be added to system 100 to extend the period to be within the predetermined engineering thresholds, then SDN-MLC may automatically order the component or provide an alert (e.g., via a display) regarding the component to be authorized and order by a user.

With continued reference to step 192, as disclosed herein, optimal estimate may consider the lowest capital cost but yet the estimation may satisfy both no-fail scenario and a specified set of failure scenarios and under each such scenario it should satisfy a specified set of engineering rule constraints (e.g., percentage of traffic of each type to be carried and latency constraints). Again, due to lack of joint global optimization of IP and optical layers, conventional approaches used significantly more IP resources and optical resources. It is contemplated that step 192 may be used for immediate problem (e.g., outage) resolution.

At step 193, SDN-MLC 112 may provide instructions based on the determination of step 192. For example, SDN-MLC 112 may communicate with routers, ROADMs, tails, ordering system 115, ROADM SDN controller 110, or the like to execute the determination of step 192. ROADM SDN controller 110 may be an intermediate device that may directly communicate with optical layer 150 devices. Ordering system 115 may be used to order one or more devices for future use (e.g., spare). There may be an anticipated need for the spare based on the information of step 191. At this step, SDN-MLC 112 may display options for system 100 that is acted on by a user or provide instructions for a near-real time automatic change in telecommunication network operation that addresses the immediate problem.

SDN-MLC 112 may manage the multiple layers of system 100 in a closed loop and heuristic manner. In a first example, this management may allow for dynamic mapping between a router layer and an optical layer by using colorless or directionless open ROADMs and reusing non-failed router layer or optical layer components of a failed link. In a second example, this management may allow for the use of spare tails (connection between a router port and optical transponder port) and spare optical regenerators. In a third example, this management by SDN-MLC 112 may allow router layer devices to be physical or virtual and software and hardware to be aggregated (e.g., traditional routers) or dis-aggregated (e.g., whitebox switches).

Based on the network condition (e.g., traffic matrix or outages) changes, the mapping between IP (e.g., router) and optical layers may be changed to more efficiently carry traffic under the changed network condition. Joint optimization of IP and optical layers whenever the network condition changes may be done by using algorithms based on integer linear programming or heuristics.

Figure 3:
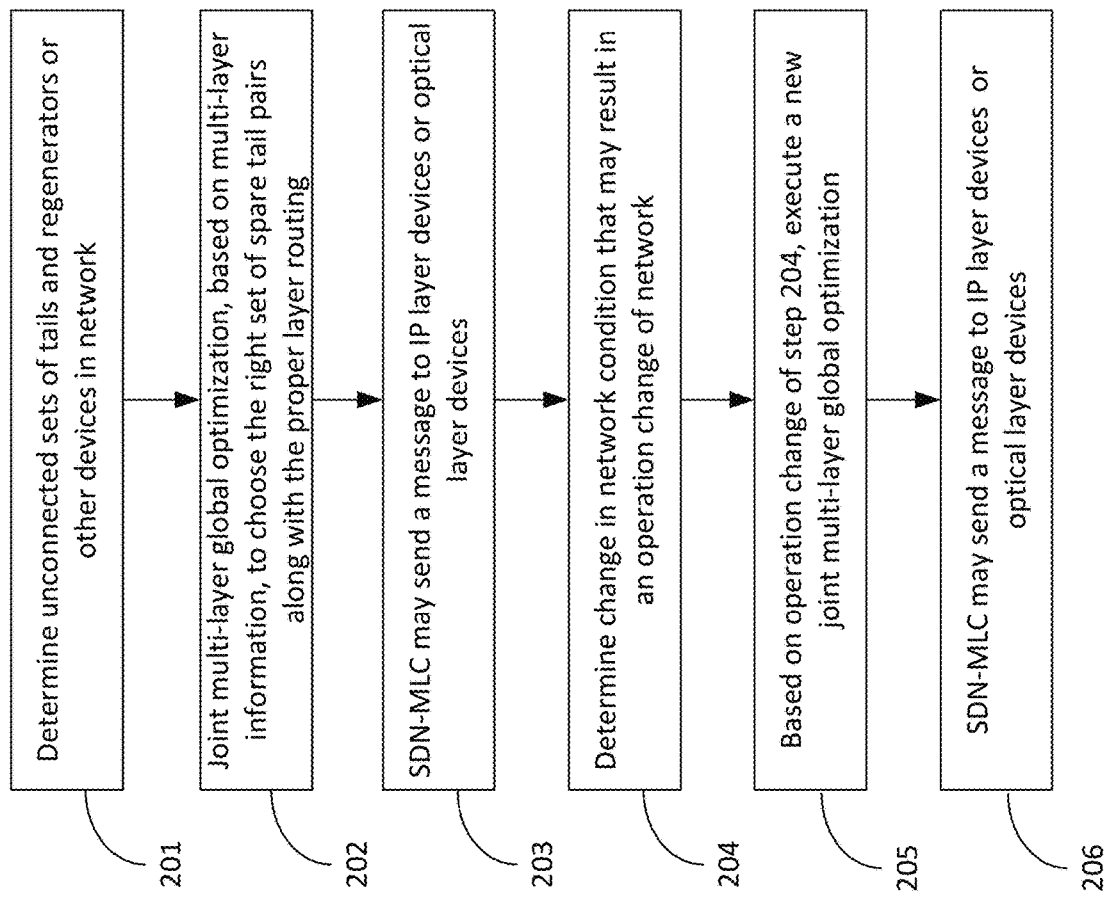
FIG. 3 illustrates an exemplary method for managing multi-layer system self-optimization.

FIG. 3 illustrates an exemplary method for managing multi-layer systems (e.g., near real-time optimization) as disclosed herein. At step 201, initially system 100 may include unconnected sets of tails and regenerators. Each such tail and optical regenerator may be classified as spare tails and spare optical regenerators. The classification and the control of the devices (e.g., tail and optical regenerator) can be done automatically. For a given network condition, only a selected subset of spare tail pairs may be connected to form an IP link that carries the required traffic (e.g., less than 70 percent load) under the required latency constraints (e.g., 5 ms). Depending on the length (e.g., in miles) of a specific IP link, it may require spare optical regenerators as well. At step 202, a joint multi-layer global optimization may be done to choose the right set of spare tail pairs (plus optical regenerators, if needed) along with the proper IP layer routing. The joint optimization should satisfy engineering rule constraints (e.g., percentage of traffic of each type to be carried and latency constraints), use realizable routing (e.g., shortest path routing, constrained shortest path routing, multi-commodity flow routing with the restriction of equal splitting of traffic units, etc.), or optimize some other desirable quantities (e.g., maximizing unused spare tails and regenerators, minimizing the maximum traffic on a link, etc.). At step 203, SDN-MLC 112 may provide instructions for IP devices (e.g., physical or virtual routers) or optical layer devices to be turned up or down depending on network conditions of system 100.

With continued reference to FIG. 3, at step 204, there may be a detected change in network condition that may result in a change in the traffic matrix and a certain set of tails and regenerators to fail, or alternatively some previously failed tails and regenerators may become operational. At step 205, taking account of the traffic and failure conditions, a new joint multi-layer global optimization may be performed. The new joint multi-layer global optimization may result in some previously established IP links to be taken down and some new IP links to be added and thus also reflecting the dynamic nature and control of the network topology. The joint global optimization problem may be formulated as an exact integer linear programming problem, but if the exact algorithm is time consuming (e.g., hours) then a fast heuristic, which may take seconds or minutes, may be used. At step 206, SDN-MLC 112 may provide instructions for IP devices (e.g., physical or virtual) or optical layer devices to be turned up or down depending on network conditions of system 100. Software or hardware may remain aggregated or may be disaggregated.

Figure 4:
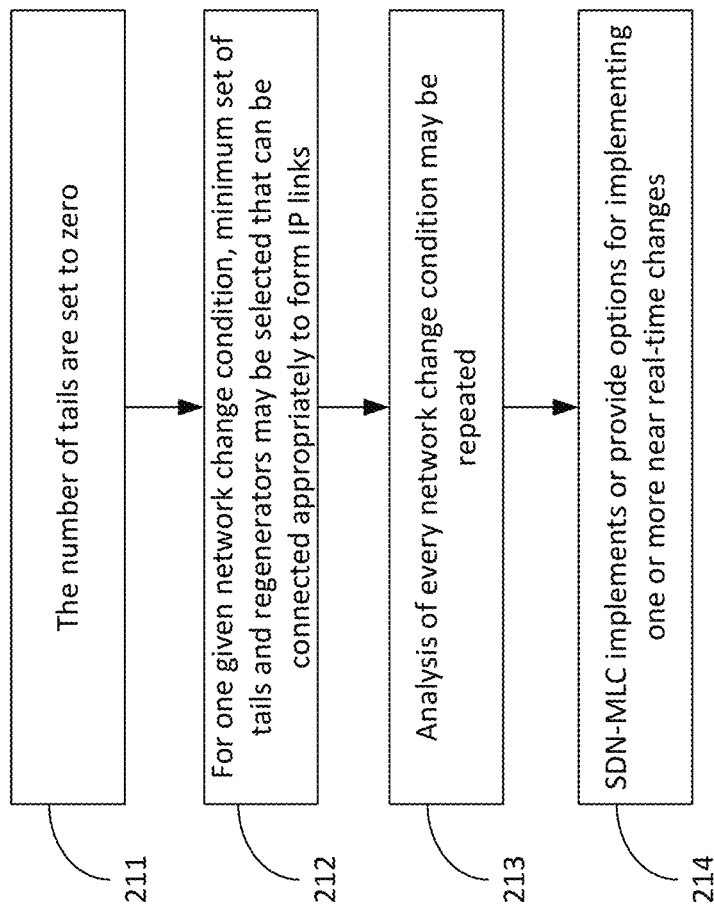
FIG. 4 illustrates an exemplary method for multi-layer system optimization as disclosed herein.

FIG. 4 illustrates another exemplary method for near real-time optimization as disclosed herein. The main capacity units used to optimize over are the tails and regenerators where a tail includes an IP port and a transponder. Let C1 and C2 represent the costs of a tail and a regenerator respectively, and N1 and N2 represent the numbers of tails and regenerators needed in the final solution. The quantity (C1*N1+C2*N2) is optimized over the possible network change scenarios. At step 211, the number of tails are set to zero. Initially the network may only include zero tails and zero regenerators. At step 212, for one given network change condition, minimum set of tails and regenerators may be selected that can be connected appropriately to form IP links that can carry the required traffic under the required engineering rule constraints. At step 213, the analysis of every network change condition may be repeated. This selection may be based on analysis of many different traffic scenarios and different failure scenarios. Preferably, all the different combination are analyzed. For example, repeated may be similar to the following: 1). Peak traffic on day 1; 2) Peak traffic on day 2; 3) Day 1, but some of the links/routers have failed—with same traffic load for day 1, etc. For any given network change condition, tails and regenerators used for previous network change conditions may be considered for reuse. The joint global optimization problem over the several network change scenarios can be formulated as an exact integer linear programming problem, but if the exact algorithm is time consuming then a fast heuristic may be used.

At step 214, SDN-MLC 112 implements or provides options (e.g., displays) for implementing one or more immediate changes.

The disclosed near real-time optimization approach may anticipate all failure and traffic surge scenarios over the next few weeks or months and for each scenario may consider a joint router layer or optical layer global optimization to minimize the total cost of tails, regenerators, or other devices. The disclosed methods, systems, and apparatuses may provide an optimal network that results in network capex savings in the range of 15-30% or more. Table 1 helps illustrate an example with the components of cost that may include router IP port, optical transponder, or optical regenerator. For this example, note that Tail=Packet Port+Transponder; traffic Numbers~YE'20 with current engineering rules assumed; Cost assumptions are: 1) optical regenerator cost~1.5*Transponder cost; and 2) router port cost ~2.5*Transponder cost. The normalized cost is in units of transponder cost for this example. As shown, there is potential for ~34% CAPEX cost saving with joint global optimization.

TABLE 1

| Scenario | # of 100 GE Tails | # of 100 GE Regens | Normalized Cost |
| --- | --- | --- | --- |
| PMO | 1153 | 226 | 2105 |
| +Fast Provisioning | 1048 | 105 | 1913 (−9%) |
| +Joint Optimization on Existing Links | 939 | 91 | 1711 (−18.5%) |
| +Joint Global Optimization (add links anywhere) | 740 | 130 | 1392 (−34%) |

Figure 5:
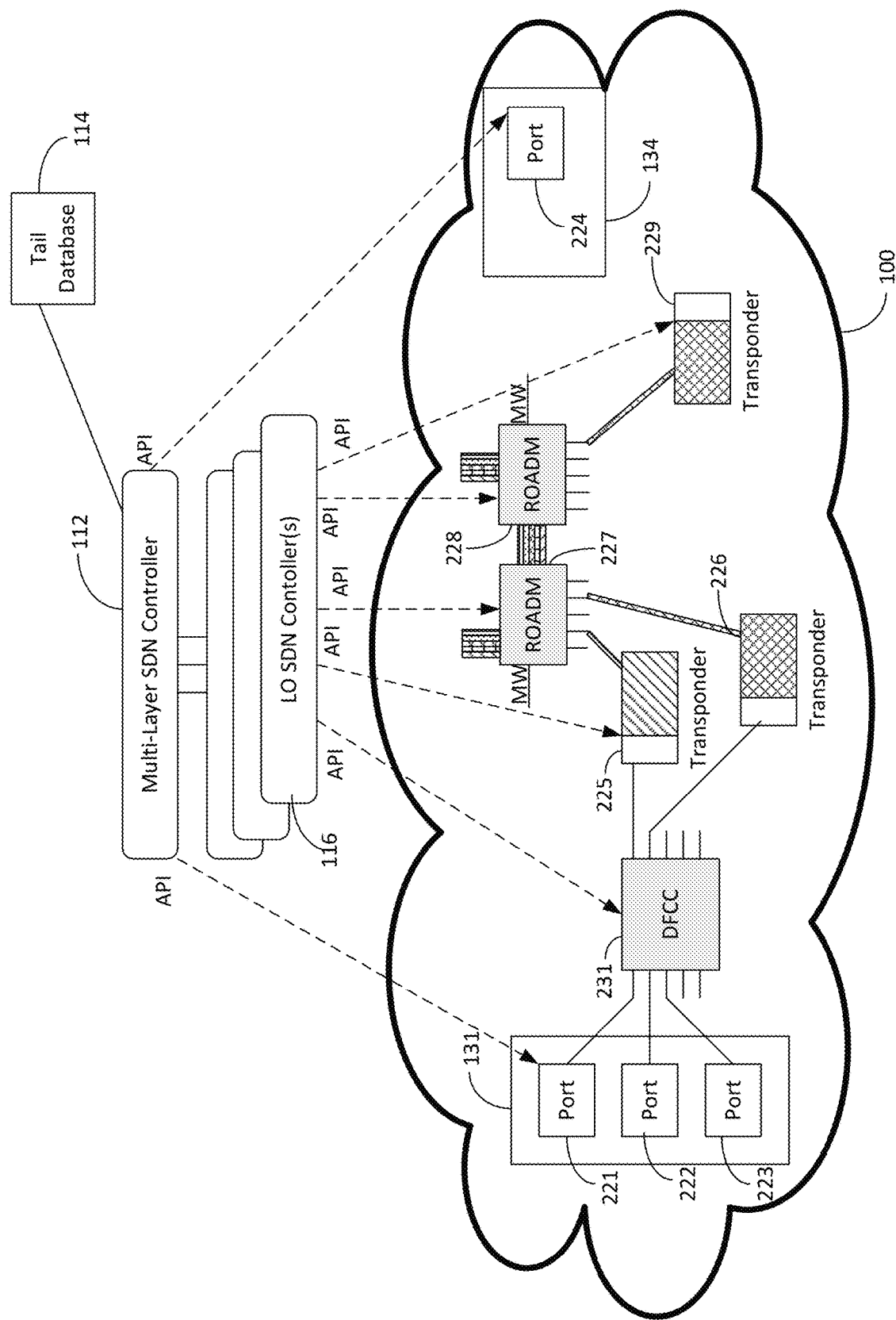
FIG. 5 illustrates an exemplary system for multi-layer optimization.

FIG. 5 illustrates an exemplary system for multi-layer system optimization. As shown, there may be SDN-MLC 112 that communicates with optical layer 150 devices (e.g., transponder 225, transponder 226, ROADM 227, ROADM 228, transponder 229, or DFCC 231) and router layer 130 devices, such as port 221-port 224 or router 131. Port 221-port 224 for simplicity are considered as different ports off of one router 131, but may represent ports across multiple routers. SDN-MLC 112 may communicate to optical layer (e.g., layer zero) via an optical layer SDN controller (herein known as L0 SDN controller 116). DFCC 231 is a Dynamic Fiber Cross Connect that allows for automatically switching between ports and transponders, as presented. It is contemplated herein that other devices that may use an automatic switching function may be used herein.

The disclosed configuration, as shown in FIG. 5, further assists with framework for a tight closed loop control of a multi-layer packet/optical network operation. Forecasts, as disclosed herein, of network conditions (traffic matrix and outages) may be based on machine learning approaches, knowledge of future maintenance events, knowledge of future bandwidth-calendaring commitments, or near real-time monitoring of traffic and failures. The machine learning approach can predict traffic or outage at a future point of time by observing massive amount of traffic and outage data in the past and applying artificial intelligence and computational statistical techniques. The bandwidth-calendaring provides bandwidth to users over a certain pairs of sources and destinations in the network over a certain future period of time. Based on past observation, the network operator knows when and where spare bandwidth will be available and schedules new bandwidth-calendaring requests to optimally fill in the gaps. DFCC 231 facilitates decoupling of components of a tail (e.g., router port and optical transponder) and dynamically connecting the components of the tail whenever needed. Router 131 may have a spare router port 223 and there may be spare transponders. The DFCC device may dynamically connect a spare router port 223 to a spare optical transponder (e.g., transponder 225 or transponder 226) to create a tail. If the need is no longer there, then the connection may be severed and the router port 223 and the spare optical transponder may go back to a spare pool. Furthermore, if the components of a tails fails, the other component may stay operational and may be able to form a new Tail by connecting with a spare complementary component. This function may assist in a more efficient network bandwidth usage and allow for a more optimal bandwidth on demand or bandwidth calendaring service. As an example, consider a location with two different router ports R1 and R2 and one transponder T. Initially the DFCC is used to create a Tail by connecting R1 and T. This Tail in turn can be connected with another Tail (and 0 or more regens) to create an end-to-end IP link. Now suppose the router port R1 fails. Normally that means both the Tail and the associated end-to-end IP link will also fail. However, using the DFCC we can remove the connection between R1 and T and instead create a new Tail by connecting R2 with T. Using this new Tail, we can create another end-to-end IP link. If we did not have DFCC, we would have had to provision a new Tail, which would have been expensive. In addition, depending on a bandwidth-calendaring service need, it may be more useful to have the tail starting from router port R1 or router port R2 and the DFCC device can make the appropriate switch.

Figure 6:
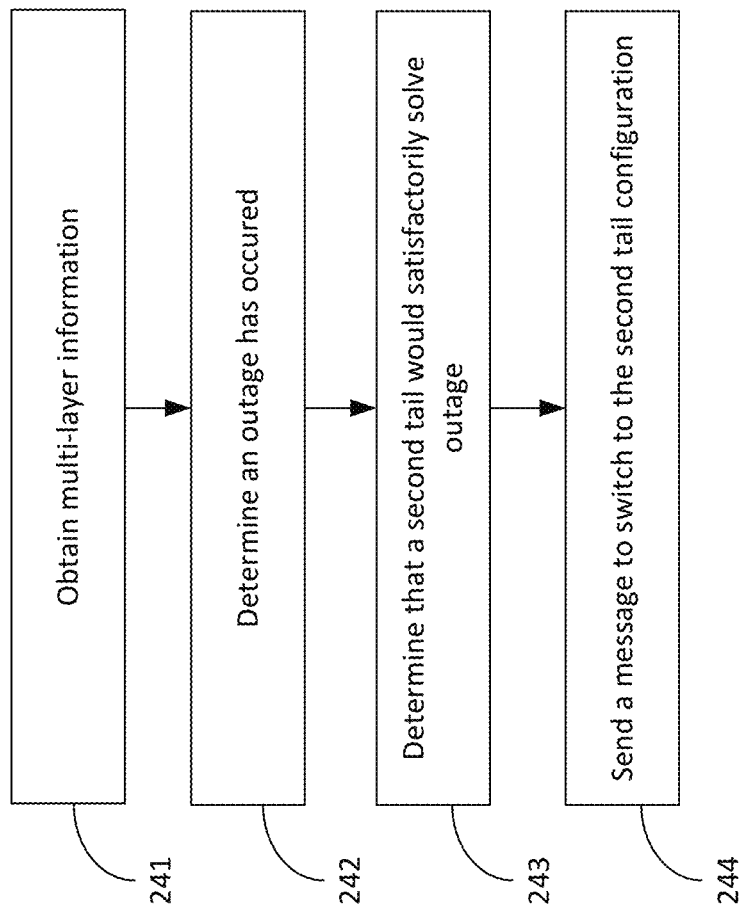
FIG. 6 illustrates an exemplary method for multi-layer optimization.

FIG. 6 illustrates an exemplary method for tail configuration in a software-defined network. In an exemplary scenario, initially, port 221 may connect through DFCC 231 to transponder 225 and port 222 may connect through DFCC 231 to transponder 226. Port 223 may be considered a spare port that may not connect with a transponder. At step 241, information may be obtained about system 100. The obtained information may include information associated with transponder 225, transponder 226, or port 221 through port 223. The information may include whether transponders are active (e.g., being used), whether transponders are functional (e.g., in working condition), locations of transponders in connection with DFCC 231, or status of transponder as a spare. The aforementioned transponder information may apply to information associated with a router port. Other information as discussed herein may also be obtained. At step 242, there may be a determination that there is an undesirable network condition (e.g., link down or error). This determination may be based on the information of step 241.

At step 243, based on the determining of the undesirable network condition of step 242, there may be a determination that a second tail reconfiguration (e.g., port 223-to-transponder 225) may satisfactorily resolve the undesirable network condition associated with a first tail configuration (e.g., port 221-to-transponder 225). Associated with this step 243, there may be a determination of which ports and transponders are usable. If a port or transponder is not usable (to resolve the undesirable network condition) then DFCC 231 may be used to switch to the respective usable port or transponder. So in this scenario, port 223 may be used in place of port 221, while the same transponder 225 may be used. In this situation, SDN-MLC 112 may also need to send instructions to router 131 to reconfigure port 223 to duplicate most or all of the port configurations that were on port 221. Configurations may include internet protocol addresses or tunneling configurations among other things.

At step 224, there may be a message sent (e.g., by SDN-MLC 112 or L0 SDN controller 116) to switch to the determined second tail reconfiguration of step 223. Subsequent to the switch, the tail database 114 may be updated. It is contemplated that other changes to system 100 may be made (e.g., similar to configurations in step 192). It is further contemplated herein that the steps and configurations as described throughout may be used in combination or out of order of the steps presented.

Although a router layer, optical layer, and MPLS tunneling layer are discussed, it is contemplated that the MPLS tunneling layer may be some other tunneling layer or not present at all. Also, it is contemplated that the optical layer may be another physical layer other than optical. As discussed herein, the router layer, may be a switching layer or the like. It is contemplated herein that the term information as considered herein may be information on any layer (e.g., layer 130 or layer 150). Activity patterns as disclosed herein may be considered "information" which is used in step 192. Whether an outage is scheduled or unscheduled is other information that may be used for determining near real-time optimization solutions. With reference to estimated time for repair, it is contemplated that sometimes it may take less time to implement a router layer solution rather than an optical layer solution (or vice versa). Although time may be a significant factor, SDN-MLC 112 may consider a predetermined weight of the information in order to derive a weighted determination (e.g., step 192 or step 202). The disclosed techniques may be used to help change the configuration of devices in different layers of the network so that near real-time optimization may meet the quality of service requirements of the network.

FIG. 7 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 7 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 7) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card or wired communications (e.g., optical lines) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 8:
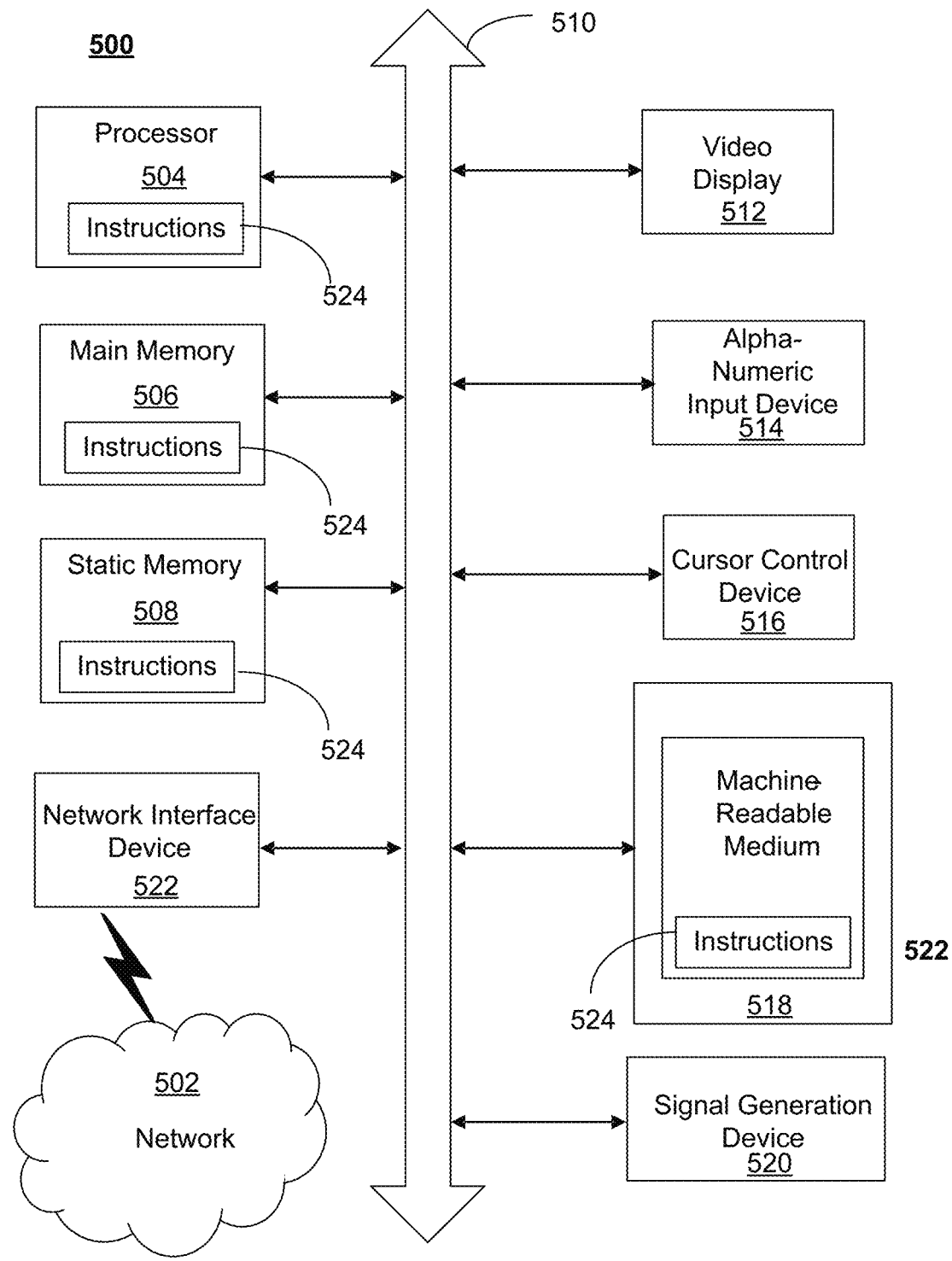
FIG. 8 illustrates an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, router 131, and other devices of FIG. 1A, FIG. 1B, and FIG. ZZ2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 9:
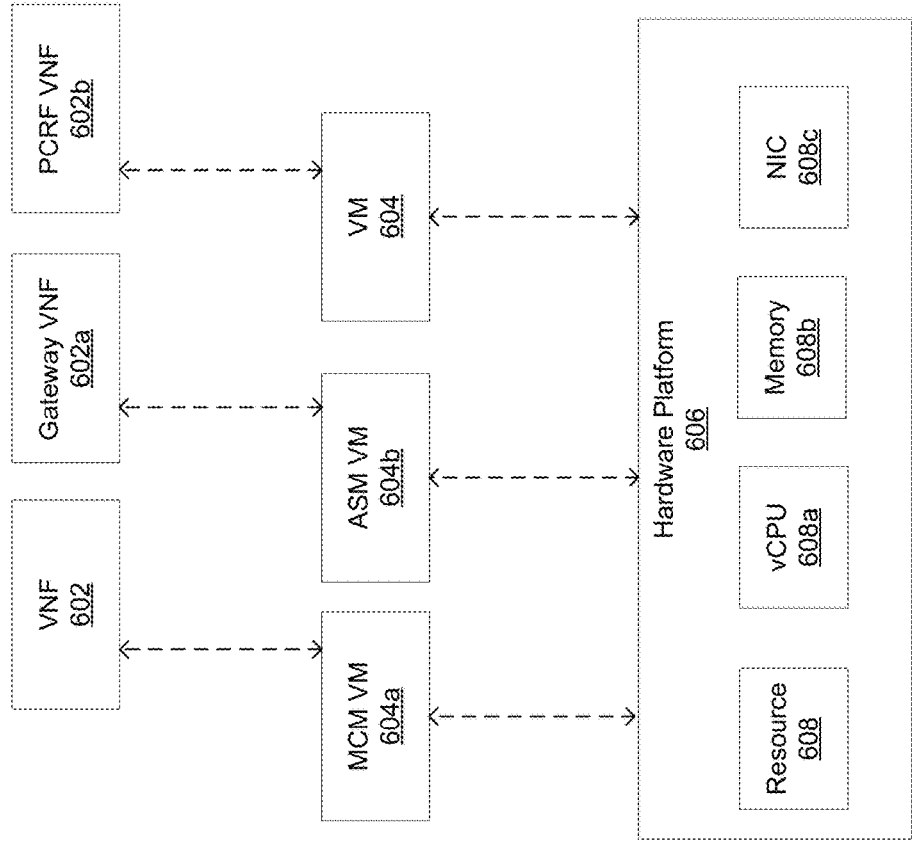
FIG. 9 is a representation of an exemplary network.

FIG. 9a is a representation of an exemplary network 600 (e.g., cloud). Network 600 (e.g., system 100) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 9a illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 9a illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

While FIG. 9a illustrates resources 608 as collectively contained in hardware platform 606, the configuration of hardware platform 606 may isolate, for example, certain memory 608c from other memory 608c.

As described herein, a telecommunications system wherein management and control utilizing a software designed network (SDN) and a simple IP are based, at least in part, on user equipment, may provide a wireless management and control framework that enables common management and control, such as mobility management, radio resource management, QoS, load balancing, etc., across many technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

Crossing or meeting a threshold as discussed herein, which may trigger the determining step 192, may be described as surpassing a number that is prescribed in order to determine when some action is triggered. For example, a threshold may be crossed if the number of keepalives from a device is below a certain amount (e.g., 3) within a timeframe (e.g., 10 minutes) and therefore an alert may be triggered. In another example, a threshold may be crossed if the number of errors is above a certain amount (e.g., 100) within a certain time frame (e.g., 1 minute) and therefore an alert may be triggered.

While examples of a telecommunications system in which multi-layer self-optimization may be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses (e.g., devices) of the subject matter of the present disclosure—multi-layer system self-optimization—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. Real-time as discussed herein refers to operations that usually occur in seconds, but not more than a minute. As disclosed herein, near real-time events usually occur within minutes. A traffic matrix may represent the load from each ingress point to each egress point in an IP network. Although networks are engineered to tolerate some variation in the traffic matrix, large changes may lead to congested links and poor performance. Configuration change of a component as disclosed herein may include a software change or a hardware change (e.g., replace or remove).

This written description uses examples to enable any person skilled in the art to practice the claimed invention, including making and using any devices or systems and performing any incorporated methods.

What is claimed:

1. An apparatus comprising:
    a processor; and
    a memory coupled with the processor, the memory storing executable instructions that when executed by the processor cause the processor to effectuate operations comprising:
        obtaining multiple layer information associated with multiple layers of a telecommunications network, the multiple layer information comprising optical layer information or router layer information;
        forecasting a network condition based on the multiple layer information, wherein the forecasting is based on machine learning;
        determining a configuration change of the telecommunications network for avoiding the forecasted network condition; and
        sending a message to a device in order to implement the configuration change.

2. The apparatus of claim 1, wherein the optical layer information is obtained from a dynamic fiber cross connect.

3. The apparatus of claim 1, wherein the routing layer information is obtained from a router.

4. The apparatus of claim 1, wherein the optical layer information comprises a load along an optical path.

5. The apparatus of claim 1, wherein the device is a component of the optical layer.

6. The apparatus of claim 1, wherein the device is an optical regenerator.

7. The apparatus of claim 1, wherein the device is a tail.

8. The apparatus of claim 1, wherein the device is a reconfigurable optical add-drop multiplexer.

9. A method comprising:
    obtaining multiple layer information associated with multiple layers of a telecommunications network, the multiple layer information comprising optical layer information or router layer information;
    forecasting a network condition based on the multiple layer information, wherein the forecasting is based on machine learning;
    determining a configuration change of the telecommunications network for avoiding the forecasted network condition; and
    sending a message to a device in order to implement the configuration change.

10. The method of claim 9, wherein the optical layer information is obtained from a dynamic fiber cross connect.

11. The method of claim 9, wherein the routing layer information is obtained from a router.

12. The method of claim 9, wherein the optical layer information comprises a load along an optical path.

13. The method of claim 9, wherein the device is a component of the optical layer.

14. The method of claim 9, wherein the device is an optical regenerator.

15. The method of claim 9, wherein the device is a tail.

16. A computer readable storage medium that is not a signal storing computer executable instructions that when executed by a computing device cause said computing device to effectuate operations comprising:
- obtaining multiple layer information associated with multiple layers of a telecommunications network, the multiple layer information comprising optical layer information or router layer information;
- forecasting a network condition based on the multiple layer information, wherein the forecasting is based on machine learning;
- determining a configuration change of the telecommunications network for avoiding the forecasted network condition; and
- sending a message to a device in order to implement the configuration change.

17. The computer readable storage medium of claim 16, wherein the optical layer information is obtained from a dynamic fiber cross connect.

18. The computer readable storage medium of claim 16, wherein the routing layer information is obtained from a router.

19. The computer readable storage medium of claim 16, wherein the optical layer information comprises a load along an optical path.

20. The computer readable storage medium of claim 16, wherein the device is a component of the optical layer.

* * * * *